(12) United States Patent
Tevs

(10) Patent No.: US 10,048,116 B2
(45) Date of Patent: Aug. 14, 2018

(54) DETECTION SYSTEM FOR IDENTIFYING BLOCKAGES IN GUIDE VANES OF A TURBINE ENGINE

(71) Applicant: Nikolai R. Tevs, Daytona Beach Shores, FL (US)

(72) Inventor: Nikolai R. Tevs, Daytona Beach Shores, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 969 days.

(21) Appl. No.: 13/974,219

(22) Filed: Aug. 23, 2013

(65) Prior Publication Data

US 2015/0056077 A1   Feb. 26, 2015

(51) Int. Cl.
| | |
|---|---|
| *F01B 25/26* | (2006.01) |
| *G01H 13/00* | (2006.01) |
| *F01D 17/20* | (2006.01) |
| *F01D 21/00* | (2006.01) |
| *G01H 1/00* | (2006.01) |

(52) U.S. Cl.
CPC .............. *G01H 13/00* (2013.01); *F01D 17/20* (2013.01); *F01D 21/003* (2013.01); *G01H 1/006* (2013.01); *F05D 2260/96* (2013.01); *F05D 2270/821* (2013.01)

(58) Field of Classification Search
CPC ........ G01H 13/00; G01H 1/006; F01D 17/20; F01D 21/003; F05D 2260/96
USPC ....................................... 415/118
See application file for complete search history.

(56) References Cited

U.S. PATENT DOCUMENTS

| | | | |
|---|---|---|---|
| 5,969,340 A | 10/1999 | Dragne et al. | |
| 6,661,514 B1 | 12/2003 | Tevs et al. | |
| 6,907,368 B2 | 6/2005 | Bechtold et al. | |
| 7,415,135 B2 | 8/2008 | Tevs et al. | |
| 8,074,586 B2 | 12/2011 | Garner et al. | |
| 8,418,636 B2 | 4/2013 | Liu et al. | |
| 2004/0089812 A1* | 5/2004 | Favro ....................... | G01N 3/60 250/341.6 |
| 2005/0165510 A1* | 7/2005 | Jensen ....................... | F03B 3/02 700/280 |
| 2007/0132461 A1* | 6/2007 | Holmquist .............. | F01D 17/02 324/644 |
| 2007/0250245 A1 | 10/2007 | Vab Der Merwe et al. | |
| (Continued) | | | |

FOREIGN PATENT DOCUMENTS

EP           2538034 A2   12/2012

*Primary Examiner* — Jason Shanske

(57) ABSTRACT

A detection system for a turbine engine that is configured to identify the presence of at least a partial blockage of guide vanes by monitoring deflection of an adjacent row of turbine blades. The detection system may include one or more sensors positioned radially outward from tips of turbine blades in a row of turbine blades adjacent an upstream row of guide vanes that remain stationary. The detection system may also include a conditioning module in communication with the sensor to amplify the output signals received from the sensor. A processing module may be in communication with conditioning module to analyze signals produced by the sensor via the conditioning module and generate an alarm if the processing module detects a change in amplitude, such as an increase of amplitude at frequencies between about 400 Hertz and about 900 Hertz.

14 Claims, 3 Drawing Sheets

(56) References Cited

U.S. PATENT DOCUMENTS

| | | |
|---|---|---|
| 2009/0301055 A1 | 12/2009 | Kallappa |
| 2010/0089166 A1* | 4/2010 | Zielinski ................ G01H 1/006 73/660 |
| 2010/0127694 A1* | 5/2010 | Weickert .................. G01B 7/30 324/207.16 |
| 2011/0178772 A1 | 7/2011 | Gerez et al. |
| 2011/0303137 A1 | 12/2011 | Tevs et al. |
| 2012/0042813 A1 | 2/2012 | Liu et al. |

\* cited by examiner

DETECTION SYSTEM FOR IDENTIFYING BLOCKAGES IN GUIDE VANES OF A TURBINE ENGINE

FIELD OF THE INVENTION

This invention is directed generally to turbine engines, and more particularly to detection systems for blockages in row one guide vanes in gas turbine engines.

BACKGROUND

Typically, gas turbine engines include a compressor for compressing air, a combustor for mixing the compressed air with fuel and igniting the mixture, and a turbine blade assembly for producing power. Combustors often operate at high temperatures that may exceed 2,500 degrees Fahrenheit. Combustors often include ceramic heat shields inside the combustor chambers. During operation, these ceramic heat shields sometimes break and block the row one guide vanes. The blockage creates a non-uniform gas flow in the turbine and induces blade vibration that often causes significant damage. Thus, a system for detecting these blockages is needed to prevent significant damage to the turbine engines.

SUMMARY OF THE INVENTION

A detection system for a turbine engine that is configured to identify the presence of at least a partial blockage of guide vanes by monitoring deflection of an adjacent row of turbine blades. The detection system may include one or more sensors positioned radially outward from tips of turbine blades in a row of turbine blades adjacent an upstream row of guide vanes that remain stationary. The sensors may be configured to measure vibration of the turbine blades and to detect conditions where the vibration levels exceed a threshold level. The detection system may also include a conditioning module in communication with the sensor to amplify the output signals received from the sensor. A processing module may be in communication with conditioning module to analyze signals produced by the sensor via the conditioning module and generate an alarm if the module detects a change in amplitude, such as an increase of amplitude at frequencies between about 400 Hertz and about 900 Hertz.

In at least one embodiment, the detection system may include one or more sensors positioned radially outward from one or more tips of at least one turbine blade extending radially outward from a rotor assembly, whereby the rotor assembly and attached at least one turbine blade rotate relative to a rotational axis and a row of inlet guide vanes remain stationary. The detection system may also include one or more processing modules in communication with the sensor that analyzes a signal produced by the sensor and generates an alarm if the at least one sensor detects an increase of amplitude at frequencies between about 400 Hertz and about 900 Hertz. The detection system may also include a conditioning module positioned in communication between the at least one processing module and the at least one sensor. The conditioning module may amplify output signals received from the at least one sensor.

The processing module receives a signal directly or indirectly from one or more sensors and digitizes the signal. In at least one embodiment, the processing module digitizes the conditioned signal received from the conditioning module. The processing module may convert the conditioned signal once digitized into a frequency domain using a fast Fourier transform algorithm or other appropriate method. When at least a portion of one or more of the inlet guide vanes is blocked, the at least one sensor observes a stimulated blade vibration and the at least one processing module observes a modulated high-frequency signal.

The detection system may include one or more sensors. The sensors may be formed from sensors, such as, but not limited to, an eddy current sensor or a capacitive sensor. In at least one embodiment, the detection system may include at least four sensors for detecting synchronous vibrations. In another embodiment, the detection system may include at least four sensors and less than nine sensors for detecting synchronous vibrations.

During use, as the rotor assembly with turbine blades rotates relative to the rotational axis, the tips of the turbine blades pass by the sensors. Partial blockage of a guide vane produces non-uniformity of the gas flow through the turbine engine and each turbine blade in the adjacent row one is periodically subjected to an abrupt decrease of gas pressure that is similar to a shock. The shock excites the exposed turbine blade, thereby producing multiple mode vibration of the turbine blade, however, only the lowest natural modes have significant amplitudes to transfer energy to the rotor assembly, which in turn distributes a portion of the energy to each turbine blade of the row. Considering that all turbine blades in the row have similar resonant frequencies, the tip deflections of the turbine blades are larger than the rotor vibration amplitude. One or more sensors positioned adjacent to a first row, referred to as row one, of turbine blade tips may detect a partial blockage of one or more guide vanes. Using two or more sensors could improve the reliability of blockage detection by the detection system.

When at least a portion of at least one of the inlet guide vanes is blocked, the sensor may observe a stimulated blade vibration, and the at least one processing module observes a modulated high-frequency signal. The conditioning module receives a signal from the sensor and amplifies the signal received from the sensor. The conditioning module sends the amplified signal to the processing module. The processing module analyzes the amplified signal produced by the conditioning module and generates an alarm if the processing module identifies that the blade tip vibrates at an increased amplitude. In at least one embodiment, the processing module may generate an alarm if the processing module detects an increase of amplitude at frequencies between about 400 Hertz and about 900 Hertz. The processing module may generate an alarm that is an audio alarm or a visual alarm or both.

An advantage of the detection system is that the detection system is able to identify blockages of a portion of an inlet guide vane by identifying non-synchronous vibrations within the rotor assembly during gas turbine operation. These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
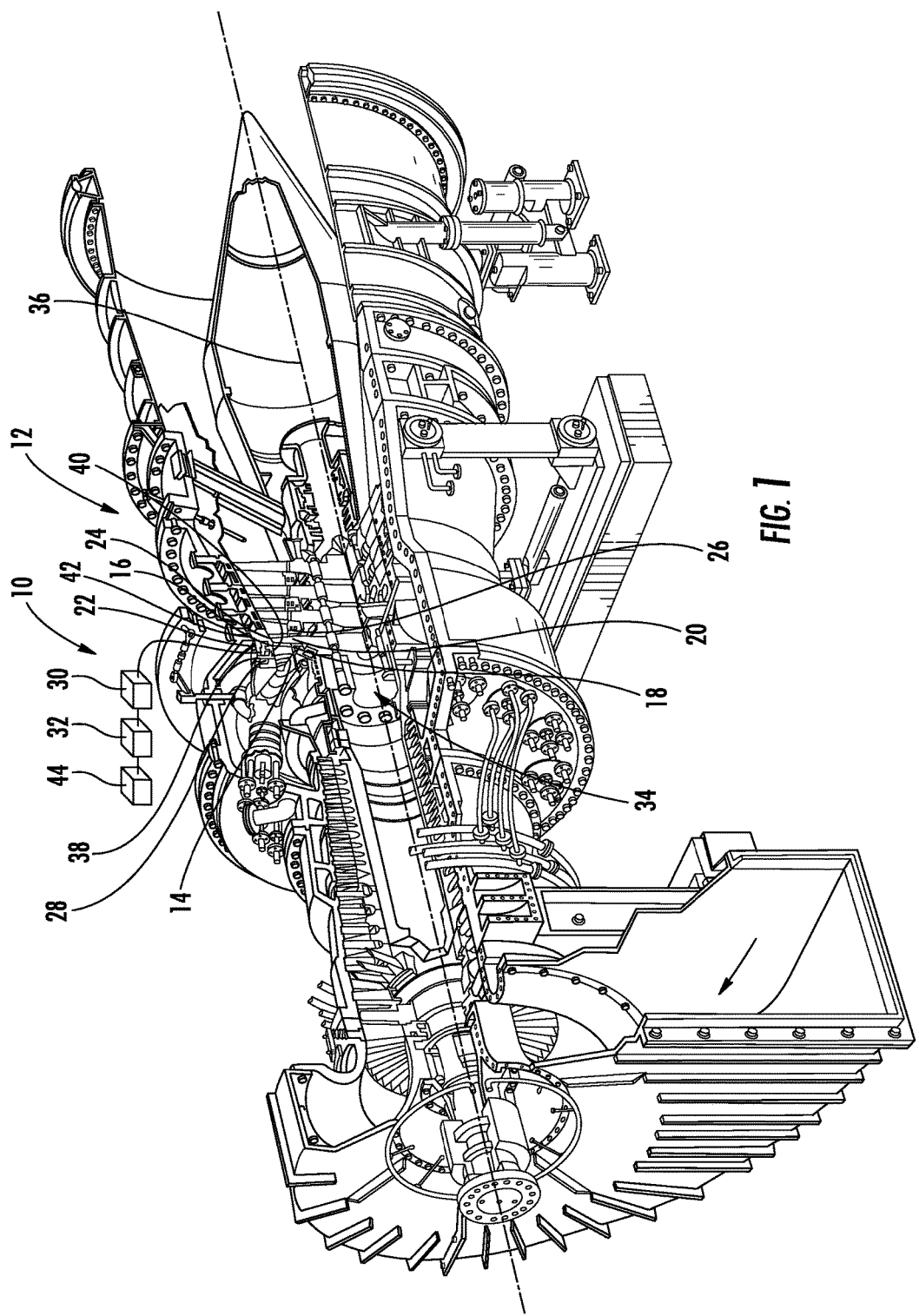
FIG. 1 is a perspective cross-sectional view of gas turbine engine with a detection system.
Figure 2:
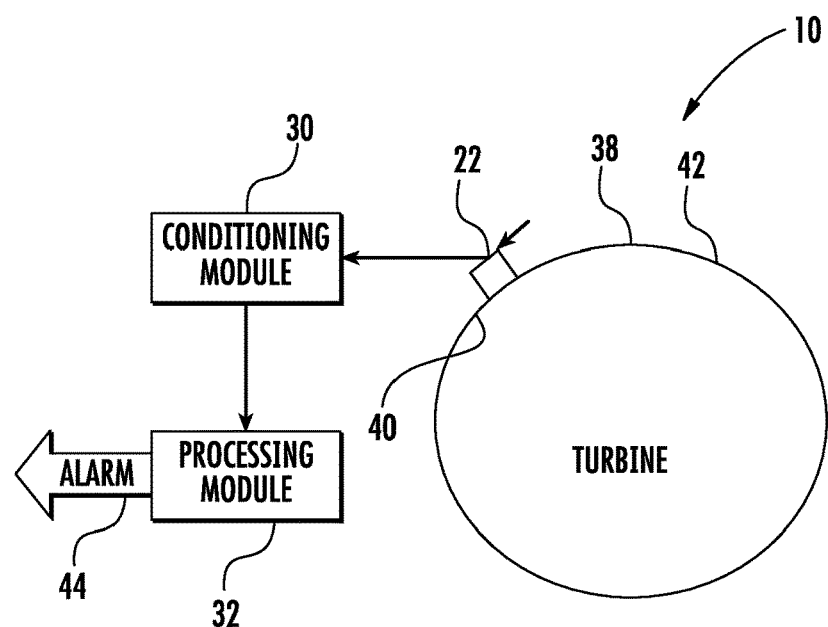
FIG. 2 is a schematic diagram of the detection system installed on a component of a gas turbine engine taken along section line 2-2 in FIG. 1.
Figure 3:
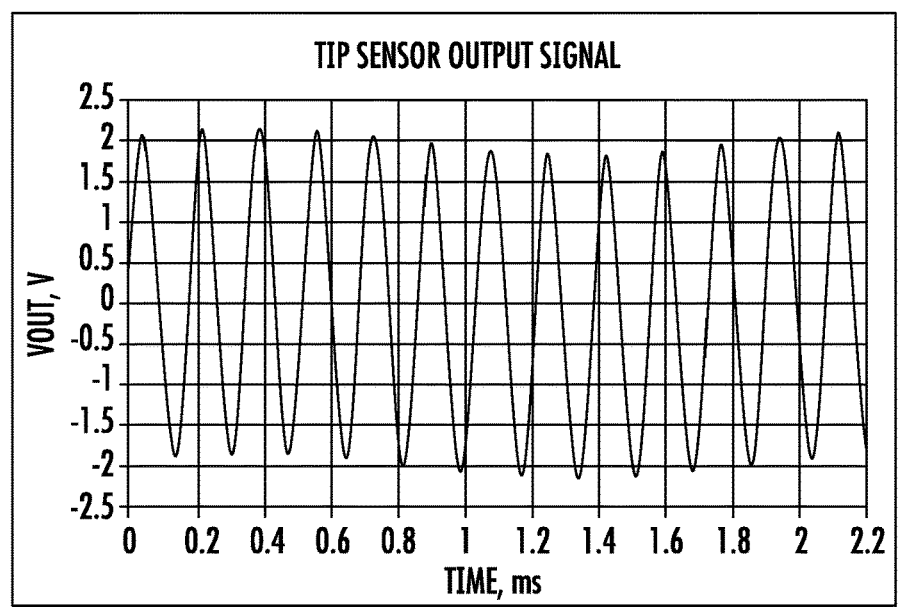
FIG. 3 is a graph of voltage of a tip sensor output signal versus time, which shows that when a tile or fragment of a tile blocks a vane, the stimulated blade vibration modulates the high frequency signal.
Figure 4:
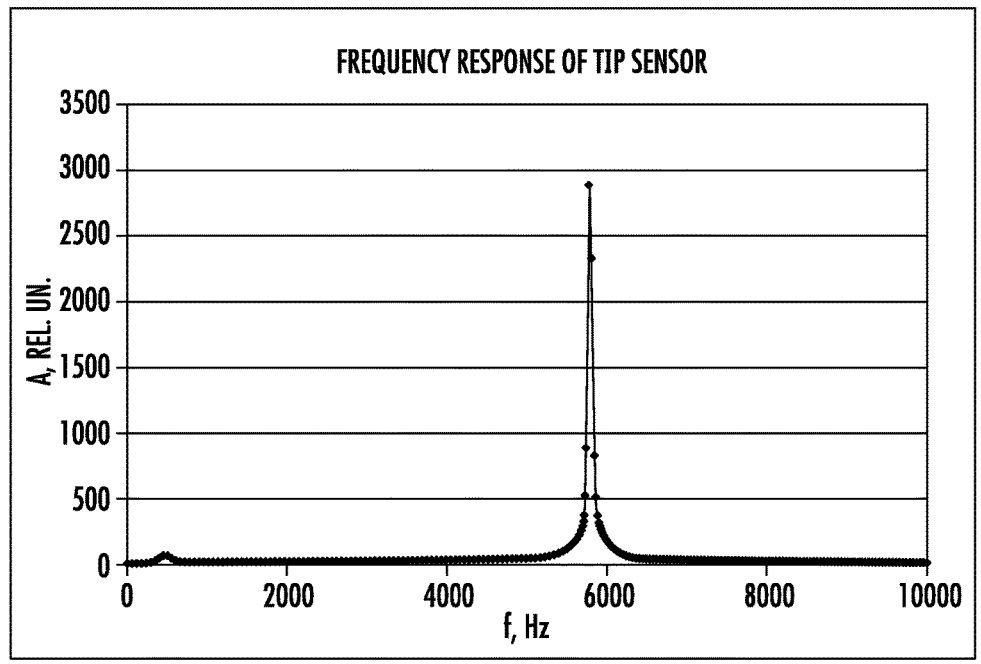
FIG. 4 is a graph of fast Fourier transform (FFT) amplitude of a tip sensor output signal versus frequency, which shows that when a tile or fragment of a tile blocks a vane.
Figure 5:
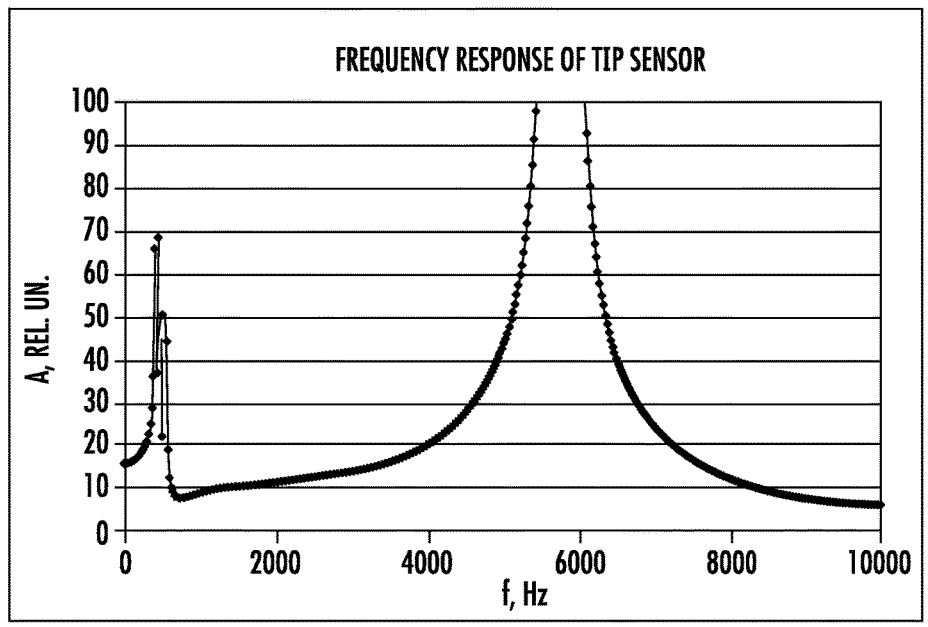
FIG. 5 is a detailed graph of low frequency bands of FFT amplitude of a tip sensor output signal versus frequency.

As shown in FIGS. 1-5, a detection system 10 for a turbine engine 12 that is configured to identify the presence of at least a partial blockage 14 of guide vanes 16 by monitoring deflection of an adjacent row 18 of turbine blades 20. The detection system 10 may include one or more sensors 22 positioned radially outward from tips 24 of turbine blades 20 in a row 26 of turbine blades 20 adjacent an upstream row 28 of guide vanes 16 that remain stationary relative to the rotational turbine blade row 26. The sensors 22 may be configured to measure vibration of the turbine blades 20 and to detect conditions where the vibration levels exceed a threshold level. The detection system 10 may also include a conditioning module 30, e.g., an amplifier in communication with the sensor 22 to amplify the output signals received from the sensor 22. In one exemplary embodiment, the amplifier may include input and output circuitry for receiving output signals from the sensor 22 and outputting signals, e.g., a conditioned signal, to a processing module 32. The processing module 32 may be in communication with conditioning module 30 to analyze signals produced by the sensor 22 via the conditioning module 30 and to generate an alarm 44 if the module 32 detects a change in amplitude, such as an increase of amplitude at frequencies between about 400 Hertz and about 900 Hertz. The processing module 32 or unit 32 may include a processing circuit in communication with an input and output circuitry. The input circuitry, e.g., receives the signals from the sensor 22 or conditioning module 30, e.g., conditioning signal, and the processing circuitry analyzes the received signal and generates the alarm upon detection an increase of amplitude. The processing circuitry may further be configured to digitize and convert the received signals, e.g., the conditioned signal, into a frequency domain using, e.g., the fast Fourier transform algorithm.

The detection system 10 may be configured to detect non-uniformity of gas flow in a gas turbine engine 12 that causes excessive vibration and failure of turbine blades 20. One or more sensors 22 may be positioned radially outward from at least one tip 24 of at least one turbine blade 20 extending radially outward from a rotor assembly 34, whereby the rotor assembly 34 and the attached one or more turbine blades 20 rotate relative to a rotational axis 36 and a row 18 of inlet guide vanes 16 remain stationary. In at least one embodiment, the sensor 22 may be coupled to an outer surface 38 of a turbine component 42 having an inner surface 40 proximate to the tips 24 of the turbine blades 20. In another embodiment, the sensor 22 may be coupled to recessed surface with the turbine component 42 having an inner surface 40 proximate to the tips 24 of the turbine blades 20. In yet another embodiment, the sensor 22 may be coupled to a surface of a component that has one or more other components positioned between an innermost surface proximate to the tips 24 of the turbine blades 20. The sensor 22 may be an eddy current sensor, a capacitive sensor or other appropriate sensor.

The sensor 22 may be configured to detect non-uniformity of gas flow in the turbine engine 12 by sensing excessive vibration. The sensor 22 may detect phase shifted sinusoidal signals that are non-synchronous. In another embodiment, the detection system 10 may include a plurality of sensors 22. For instance, there may exist at least four sensors 22. In another embodiment, there may exist sensors 22 numbering four through eight sensors 22. The plurality of sensors 22 may be used to identify synchronous vibration within the rotating turbine blades 20.

The detection system 10 may include one or more conditioning modules 30 positioned in communication between the sensor 22 and the processing module 32. The conditioning module 30 may include a preamplifier, a band pass filter and a variable gain amplifier to increase signal-to-noise ratio and to condition sensor signal for digitization.

The detection system 10 may also include one or more processing modules 32 in communication with one or more sensors 22. The processing module 32 may analyze a signal produced by the sensor 22 and may generate an alarm 44 if the processing module 32 detects an increase of amplitude. The alarm 44 may be a separate unit or may be a component of the processing module 32. In at least one embodiment, the processing module 32 may generate an alarm 44 if the processing module 32 detects an increase of amplitude at frequencies between about 400 Hertz and about 900 Hertz. The processing module 32 may digitize a conditioned signal received from the conditioning module 30. The processing module 32 may convert the conditioned signal once digitized into a frequency domain using a fast Fourier transform (FFT) algorithm. After digitization, an amplitude of the conditioned signal is presented as a sequence of numbers measured in specific time periods. A sampling frequency ($f_s$) determines a frequency range of the conditioned signal that is being analyzed. A set of $N=2^n$ consecutive samples is usually used for FFT. The transform yields vibration amplitudes at discrete frequencies in the range from 0 to $f_s/2$.

During use, as the rotor assembly 34 with turbine blades 20 rotates relative to the rotational axis 36, the tips 24 of the turbine blades 20 pass by the sensors 22. Partial blockage of a guide vane 16 produces non-uniformity of the gas flow through the turbine engine 12 and each turbine blade in the adjacent row one 26 is periodically subjected to an abrupt decrease of gas pressure that is similar to a shock. The shock excites the exposed turbine blade 20, thereby producing multiple mode vibration of the turbine blade 20, however, only the lowest natural modes have significant amplitudes to transfer energy to the rotor assembly 34, which in turn distributes a portion of the energy to each turbine blade 20 of the row 18. Considering that all turbine blades 20 in the row 18 have similar resonant frequencies, the tip deflections of the turbine blades 20 are larger than the rotor vibration amplitude. Deflection of a tip 24 of the turbine blade 20 is peaking at a resonant frequency stimulating larger sensor signal. Small differences in similar blades cause some variation in resonant frequencies and produce different phase shift relative to the exiting force. Phase shifted sinusoidal signals are non-synchronous and may be detectable with one or more sensors 22. Sensors may detect the vibrations shown in FIGS. 3-5. One or more sensors 22 positioned adjacent to a first row, referred to as row one, of turbine blade tips 24 may detect a partial blockage of one or more guide vanes 16. Using two or more sensors 22 could improve the reliability of blockage detection by the detection system 10.

When at least a portion of at least one of the inlet guide vanes 16 is blocked, the sensor 22 may observe a stimulated blade vibration, and the at least one processing module observes a modulated high-frequency signal. The conditioning module 30 receives a signal from the sensor 22 and amplifies the signal received from the sensor 22. The conditioning module 30 sends the amplified signal to the processing module 32. The processing module 32 analyzes the amplified signal produced by the conditioning module 30 and generates an alarm 44 if the processing module 32 identifies an increase of amplitude. In at least one embodiment, the processing module 32 may generate an alarm 44 if the the processing module 32 detects an increase of amplitude at frequencies between about 400 Hertz and about 900 Hertz. The processing module 32 may generate an alarm 44 that is an audio alarm or a visual alarm or both.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A method comprising:
   receiving output signals from at least one sensor positioned radially outward from at least one tip of at least one turbine blade extending radially outward from a rotor assembly whereby the rotor assembly and attached at least one turbine blade rotate relative to a rotational axis and a row of inlet guide vanes remains stationary;
   amplifying said output signals via at least one amplifier in communication with the at least one sensor; and
   analyzing at least one signal from the at least one sensor and generating an alarm when an increase of amplitude at frequencies between about 400 Hertz and about 900 Hertz is detected.

2. The method of claim 1 further comprising: digitizing a conditioned signal received from the at least one amplifer.

3. The method of claim 2 further comprising: converting the conditioned signal once digitized into a frequency domain using a fast Fourier transform algorithm.

4. The method of claim 1, wherein the at least one sensor comprises at least four sensors for detecting synchronous vibrations.

5. The method of claim 1, wherein the at least one sensor comprises at least four sensors and less than nine sensors for detecting synchronous vibrations.

6. A method comprising:
   receiving output signals from at least one eddy current sensor positioned radially outward from at least one tip of at least one turbine blade extending radially outward from a rotor assembly whereby the rotor assembly and attached at least one turbine blade rotate relative to a rotational axis and a row of inlet guide vanes remains stationary;
   amplifying said received output signals via at least one amplifier in communication with the at least one sensor; and
   analyzing at least one of the output signals produced by the at least one eddy current sensor; and
   generating an alarm when an increase of amplitude at frequencies between about 400 Hertz and about 900 Hertz is identified.

7. The method of claim 6 further comprising: digitizing a conditioned signal received from the at least one amplifier.

8. The method of claim 7 further comprising: converting the conditioned signal once digitized into a frequency domain using a fast Fourier transform algorithm.

9. The method of claim 6, wherein the at least one sensor comprises at least four sensors for detecting synchronous vibrations.

10. The method of claim 6, wherein the at least one sensor comprises at least four sensors and less than nine sensors for detecting synchronous vibrations.

11. A method comprising:
    receiving output signals via at least one capacitive sensor positioned radially outward from at least one tip of at least one turbine blade extending radially outward from a rotor assembly whereby the rotor assembly and attached at least one turbine blade rotate relative to a rotational axis and a row of inlet guide vanes remains stationary;
    amplifying the received output signals via at least one amplifier in communication with the at least one sensor; and
    analyzing at least one of the output signals produced by the at least one capacitive sensor; and
    generating an alarm when an increase of amplitude at frequencies between about 400 Hertz and about 900 Hertz is detected.

12. The method of claim 11 further comprising: digitizing a conditioned signal received from the at least one amplifier.

13. The method of claim 12 further comprising: converting the conditioned signal once digitized into a frequency domain using a fast Fourier transform algorithm.

14. The method of claim 11, wherein the at least one sensor comprises at least four sensors for detecting synchronous vibrations.

* * * * *